(12) United States Patent
Darling et al.

(10) Patent No.: US 11,468,760 B2
(45) Date of Patent: Oct. 11, 2022

(54) DEVICE FOR AND METHOD OF SENSING MOTION OR LACK-OF-MOTION USING DATA RECEIVED FROM ONE OR MORE SENSORS TO TURN ON OR OFF INTERNAL OR EXTERNAL DEVICES

(71) Applicant: Instant Care, Inc., Escondido, CA (US)

(72) Inventors: Richard Allen Darling, Poway, CA (US); Fong-Min Chang, Diamond Bar, CA (US); Chih-Cheng Tai, Campbell, CA (US)

(73) Assignee: INSTANT CARE, INC., San Diego, CA (US)

( * ) Notice: Subject to any disclaimer, the term of this patent is extended or adjusted under 35 U.S.C. 154(b) by 0 days.

(21) Appl. No.: 17/158,981

(22) Filed: Jan. 26, 2021

(65) Prior Publication Data

US 2021/0233376 A1      Jul. 29, 2021

Related U.S. Application Data

(60) Provisional application No. 62/966,005, filed on Jan. 26, 2020.

(51) Int. Cl.
| | | |
|---|---|---|
| *G08B 23/00* | (2006.01) | |
| *G08B 21/04* | (2006.01) | |
| *H04W 4/02* | (2018.01) | |
| *H04W 76/14* | (2018.01) | |

(52) U.S. Cl.
CPC ....... *G08B 21/0446* (2013.01); *G08B 21/043* (2013.01); *G08B 21/0492* (2013.01); *H04W 4/023* (2013.01); *H04W 76/14* (2018.02)

(58) Field of Classification Search
CPC .............. G08B 21/0446; G08B 21/043; G08B 21/0492; H04W 76/14; H04W 4/023
USPC ....................................................... 340/573.7
See application file for complete search history.

(56) References Cited

U.S. PATENT DOCUMENTS

| | | | |
|---|---|---|---|
| 9,084,013 B1 * | 7/2015 | Arini ................ | H04N 21/25841 |
| 9,395,792 B1 * | 7/2016 | Kahn ................... | G06F 1/3215 |
| 10,827,307 B2 * | 11/2020 | Villa ................... | G08B 21/0269 |
| 11,234,099 B2 * | 1/2022 | Roy ...................... | A61B 5/0022 |
| 2005/0093709 A1 * | 5/2005 | Franco .................. | G16H 40/67 |
| | | | 340/686.1 |
| 2011/0068944 A1 * | 3/2011 | Sacknoff ................ | G01C 21/16 |
| | | | 340/669 |
| 2011/0128183 A1 * | 6/2011 | Marshall ............... | G01S 5/0252 |
| | | | 342/357.29 |
| 2015/0208351 A1 * | 7/2015 | Deng ..................... | H04W 4/02 |
| | | | 455/456.1 |
| 2015/0365804 A1 * | 12/2015 | Chen .................... | G01S 5/0252 |
| | | | 455/456.3 |
| 2019/0172579 A1 * | 6/2019 | Peterson ................ | G16H 40/67 |
| 2019/0288755 A1 * | 9/2019 | Li ........................ | H04B 7/0814 |
| 2021/0321953 A1 * | 10/2021 | Panneer Selvam .... | A61B 5/681 |

\* cited by examiner

*Primary Examiner* — Zhen Y Wu

(74) *Attorney, Agent, or Firm* — Profound Law LLP; Shannon Yi-Shin Yen

(57) ABSTRACT

A method of and device for reducing energy consumption of a motion sensing device by reducing or avoid using function of device's internal GPS system when a predetermined condition is senses. The predetermined condition includes a predetermined state of motion or no-motion sensed. The motion sensing device includes Personal Emergency Response Systems.

8 Claims, 3 Drawing Sheets

DEVICE FOR AND METHOD OF SENSING MOTION OR LACK-OF-MOTION USING DATA RECEIVED FROM ONE OR MORE SENSORS TO TURN ON OR OFF INTERNAL OR EXTERNAL DEVICES

CROSS-REFERENCE TO RELATED APPLICATION(S)

This application claims priority under 35 U.S.C. § 119(e) of the U.S. Provisional Patent Application Ser. No. 62/966,005, filed Jan. 26, 2020 and titled, "DEVICE FOR AND METHOD OF SENSING MOTION OR LACK-OF-MOTION USING DATA RECEIVED FROM ONE OR MORE SENSORS TO TURN ON OR OFF INTERNAL OR EXTERNAL DEVICES," which is also hereby incorporated by reference in its entirety for all purposes.

FIELD OF INVENTION

The present invention relates to power management methods and devices. Further, the present invention relates to a small electronic device that is worn on a person to detect motion activity or lack or motion activity as it relates to human fall events. Specifically, the present invention relates to sensing motion in a fall detection algorithm gathered from but not limited to accelerometers, gyroscopes, magnetometers or barometers to alert a microprocessor in a small electronic device to turn on or off internal and or external devices.

BACKGROUND OF THE INVENTION

In today's rapidly aging world we are see a growing number of the U.S. population becoming 65 years of age or older. It is estimated that the senior population will grow by an average of 2.3 million people per year until the year 2030. With this accelerated growth there are obvious concerns regarding the elderly's ability to maintain an independent quality of life in the comfort of their own homes. As technology advances there have been many new products designed to help aid in independent senior living. Devices called Personal Emergency Response Systems (PERS) are offered to seniors as a way to ensure 24-hour, 7 day per week personal safety monitoring in the event of an unforeseen accident or health emergency.

At an occurrence of an emergency event, these systems are triggered by manually pressing a button on the actual main console itself. Alternatively, the system is triggered by using a wireless transmitter. Unfortunately, accidental falls constitute a large portion of senior emergencies. It has been reported that one in four Americans aged 65+ falls each year. Furthermore, falls result in more than 2.8 million injuries treated in emergency departments annually, including over 800,000 hospitalizations and more than 27,000 deaths.

During an accidental fall a user may be rendered unconscious and unable to trigger their emergency button for help. Currently, the most common methodology employed by personal emergency response system (PERS) providers today to address accidental falls is a wireless fall detection pendant that is typically worn around the neck. While these devices provide an added level of protection, they also have a downside.

Currently devices that run fall detection algorithms must continually monitor a person's activity and report updates of the unit status, location, etc. The process of continual monitoring requires considerable power draw on the device's battery source.

SUMMARY OF THE INVENTION

A method of and device for reducing energy consumption of a motion sensing device by reducing or avoid using function of device's internal GPS system when a predetermined condition is senses. The predetermined condition includes a predetermined state of motion or no-motion sensed. The motion sensing device includes Personal Emergency Response Systems.

A device for and method of sensing motion or lack of motion detected by from sensors to turn on or off internal and or external devices is disclosed. The sensors provide sensed date for the device to perform calculation using an implemented algorithm in or coupled with the device.

In a first aspect, the method comprises an algorithm using data from one or more sensors to determine whether a first of one or more thresholds are satisfied. In a second aspect, the method determines when the first of the one or more thresholds are satisfied including determining whether an acceleration vector of a user is at a predetermined angle or activity metric.

In yet another aspect, the system comprises a processing unit to run a motion-sensing algorithm that is executed by the processing unit. The algorithm determines whether first of one or more magnitude thresholds are satisfied. When/If the first or one or more magnitude thresholds are satisfied, such as an acceleration vector of the user is at a predetermined angle to a calibration vector, the algorithm determines whether/when an activity metric is satisfied and communicates this data to the processing unit to turn on or off internal or external devices.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION AND EXEMPLARY EMBODIMENTS

The present disclosure provides a device for and method of using motion or activity detected or not detected by a series of one or more sensors to manage internal and external devices and more importantly the power management/usage of the devices when performing an operation, function, or task. In some embodiments, the detection is configured to detect motion or no-motion (e.g., lack of motion).

The disclosure describes a method of sensing motion or lack of motion as it relates to performing a wide range of internal and external tasks.

Figure 1:
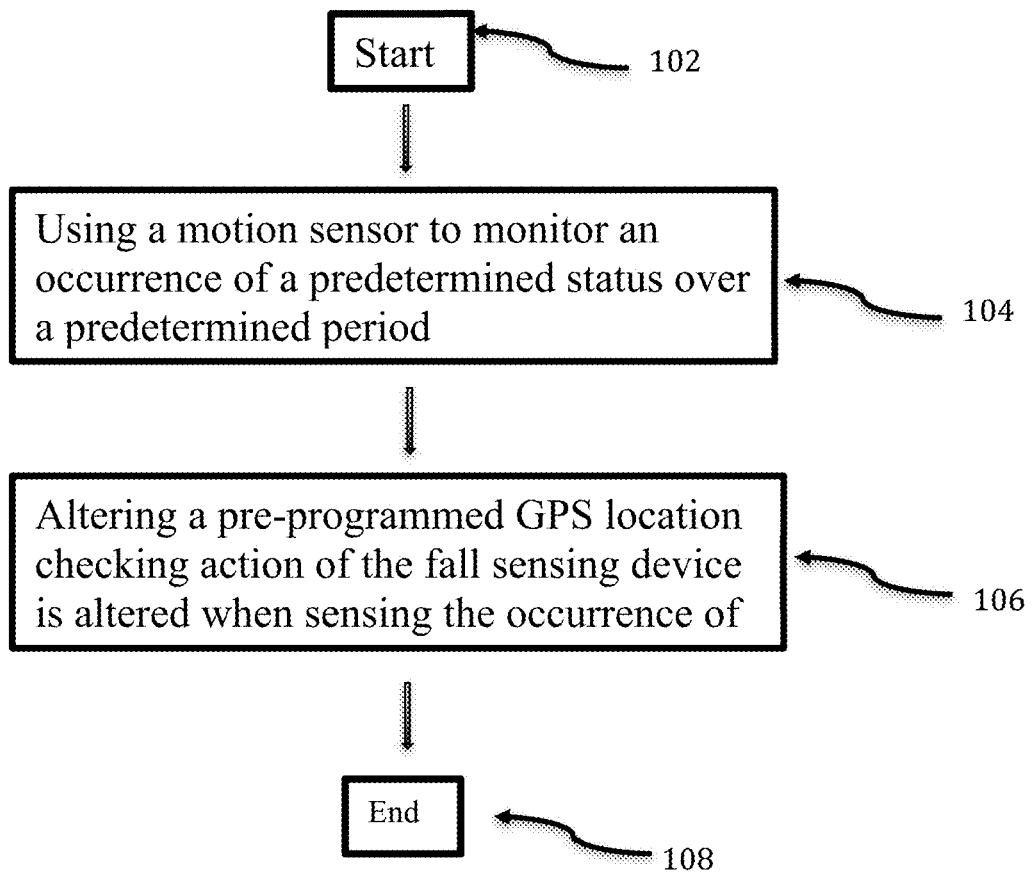
FIG. 1 illustrates an energy saving method 100 of a Personal Emergency Response Systems (PERS).

FIG. 1 illustrates an energy saving method 100 of a Personal Emergency Response Systems (PERS). The method can start at a Step 102. At a Step 104, a motion sensor is used to monitor an occurrence of a predetermined status over a predetermined period. At a Step 106, a preprogrammed GPS location checking action of the fall sensing device is altered when sensing the occurrence of the predetermined status. The method 100 can stop at a Step 108.

In one embodiment, an algorithm implemented device (e.g., a fall sensing device) tracks motion from an accelerometer to detect motion as a method to either perform or disregard an internal programmed task. In another embodiment, a magnetometer is used to detect the direction, strength, or relative change of a magnetic field at a particular location as a means to either perform or disregard an internal programmed task. In yet another embodiment, a gyroscope is used to measure angular velocity as a method to either perform or disregard an internal programmed task. In another embodiment, a Barometer is used to measure altitude change as a method to either perform or disregard an internal programmed task.

In another embodiment, one or more sensing units are used to delay, stop, alter, modify or otherwise change the internal pre-programmed task of a device.

Figure 2:
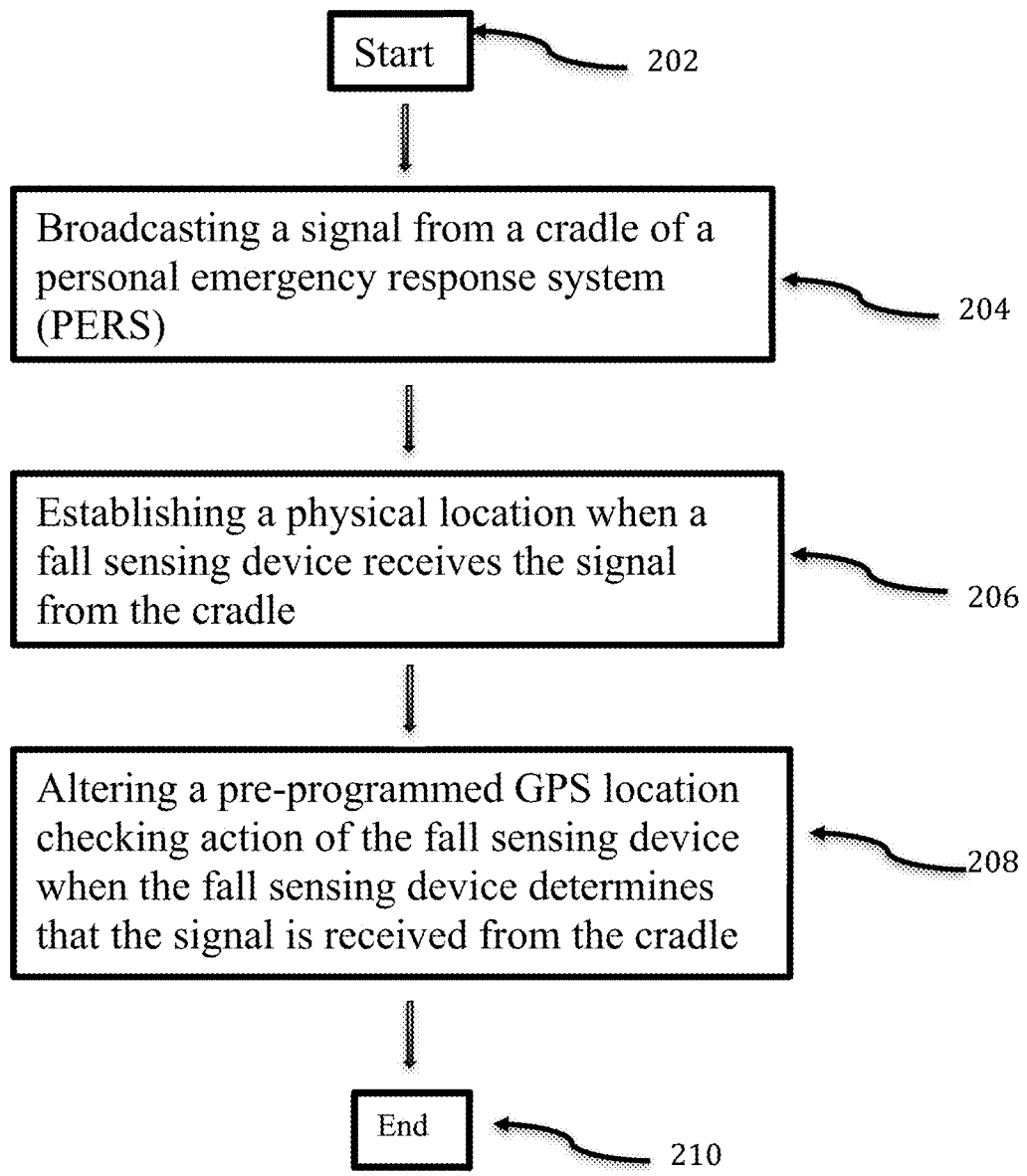
FIG. 2 illustrates another energy managing method 200 of the PERS.

FIG. 2 illustrates another energy managing method 200 of a Personal Emergency Response Systems (PERS). The method 200 can start at a Step 202. At a Step 204, a signal is broadcasted from a cradle of a personal emergency response system (PERS). At a Step 206, a physical location is established when a fall sensing device receives the signal from the cradle within a proximity distance (e.g., a WiFi signal range). At a Step 208, a pre-programmed GPS location checking action of the fall sensing device is altered when the fall sensing device determines that the signal is received from the cradle. The method 200 can stop at a Step 210.

In another embodiment, a device programmed/designed to track human falls is pre-programmed to be awake/wake up from a sleep mode at specific periods in a 24 hour cycle to communicate its location as it contains a Global Position System (GPS). This process generally requires the internal battery to consume considerable power to accomplish this task. When GPS location tracking system is located indoors, it does not work reliably inside buildings, as there is no visual contact with the GPS satellites, as a result the GPS location tracking system inside the device draws significant energy to locate GPS signals. Thereby, the present disclosure provides a device and a method to avoid this extreme power draw on the device battery. In some embodiments, the device disclosed herein using motion to wake up itself within a specific window and look for access to a Wi-Fi network instead of a GPS. When the Wi-Fi network is seen, the Wi-Fi system identifies the devices, Mac Address, or use a Wi-Fi Positioning System WPS (WPS) allowing the unit/device to bypass the needs to run the GPS location and allow the device to go back into sleep mode, thus saving considerable battery power while still establishing the devices location.

In yet another example of this embodiment, a primary device is pre-programmed to wake up and check for its GPS location. However, the primary device is able to be constructed/designed to set an internal timer that tracks inactivity. This can be when a user is sleeping for example. When a primary device sees long periods of inactivity, the device uses these periods of inactivity to forgo the GPS location process as a method to save battery power. The device could be programmed to modify the wake up cycle when establishing longer periods of inactivity. When these longer periods of inactivity are detected, the GPS check-in process can be bypassed for one or more check in cycles allowing the primary device to save precious battery power.

A further example of this embodiment could be for the primary devices preprogrammed wake cycle to be modified so that when longer periods of inactivity are established, the GPS check-in process would be bypassed by connecting to a Wi-Fi to establish the devices Mac Address as methods for establishing the primary devices location, and thus saving the primary devices battery power that is normally used to establish a GPS connection.

Figure 3:
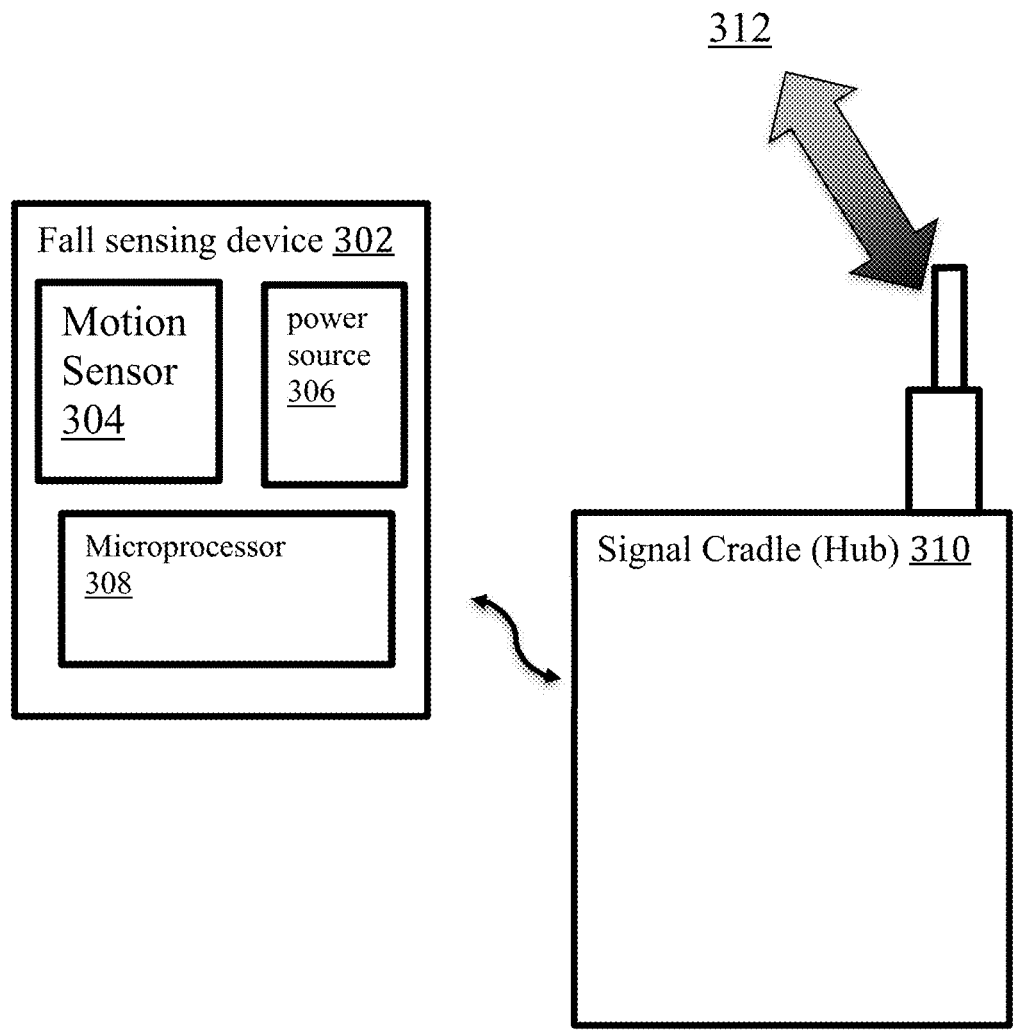
FIG. 3 illustrates a PERS system 300 in accordance with some embodiments.

FIG. 3 illustrates a PERS system 300 in accordance with some embodiments. The system 300 includes a fall sensing device 302 (e.g., a fall sensor, a mobile unit, or an electronic enclosure with one or more predetermined motion sensor). The fall sensing device 302 can include an algorithm implemented motion sensor 304 configured to detect a motion or lack of a motion over a predetermined period and a power source 306 configured to power a microcontroller 308 that runs the algorithm. In some embodiments, the power source 306 is periodically duty cycled by the microcontroller 308 when a threshold condition of motion or lack of motion is achieved.

In some embodiments, the fall sensing device 302 is configured to communicate with a cradle 310, which can be achieved by various communication methods, signals, and protocols, such as using WiFi signals or one-way/two-way communications. The cradle 310 can be a signal hub that is on an AC power outlet or powered with one or more batteries. The cradle 310 can recharge the fall sensing device 302 when the fall sensing device 302 is electrically coupled with the cradle 310. The cradle 310 is configured to signally communicative with an external/remote call center or a help dispatching center (e.g., a police department) 312.

In another example of this embodiment, a primary device is pre-programmed to wake lip and check for its GPS location. However, the primary device can be designed to set an internal timer that tracks inactivity. This can be when a user is sleeping for example. When a primary device sees long periods of inactivity the device may use these periods of inactivity to forgo the GPS location process as a means to save battery power. The device having the ability to implement artificial intelligence (AI) to learn these periods of inactivity or activity and use them to reset the wake up and reporting time frames. The AI process is again programming itself to modify the wake cycle when establishing longer periods of inactivity. When these longer periods of inactivity are detected the GPS check-in process can be bypassed for one or more check in cycles allowing the primary device to once again save precious battery power.

In another embodiment, all internal programmed task could use AI learning to modify its wake up and check in routines and can cancel and/or reset to the next scheduled check-in if/when the algorithm tracks or does not track motion for a given period of time. As an example, this process can repeat for a given period of time to provide battery savings during known hours of user rest. AI establishes this pattern and adjusts the network check as to economize the need for GPS check-in during known schedules of non-activity.

In another embodiment, all internal programmed task could use AI learning to modify its sensing routines and based on user's daily activity and behaviors, adjust primary device's sensitivity or other predetermined routines/parameters (whether is GPS, gyro, humidity or accelerometer). As an example, if a user's daily 6 pm routine is to take a shower (due to high humidity/moisture detection and specific movements), device may delay the GPS check-in time, even though it detected constant movement, as well as increase its sensitivity as most fall incidents occur in the shower. Furthermore, upon detection of a fall, primary device will send its recorded parameters that lead to the fall (e.g., 10 seconds before the fall, movements of gyro, accelerometer and humidity level) to the call center or cloud/app/mobile device, when initiating a call for help.

In another embodiment, the internal operations or functions used to check processes within the internal device itself and confirm or cancel a programmed task can be bypassed, altered, reset, etc. based on the one or more sensors sensing or not sensing activity within a device. A task as an example include an internal component designed into a system to schedule periodic sleep or wake up cycles to establish a system check-in.

However, if by example the system detects motion from one of more sensors that meets the motion thresholds the system can as a method to save battery power forgo the check in and reset an internal timer component within or separate from the component responsible for the original operation to target the next check in period. This can be repeated once or multiple number of times all in an effort to economize battery power of a given device.

In yet another embodiment, an algorithm tracks motion or lack of motion within a preset time and when motion or lack of motion is detected over a set time frame it can send or programmed not to send command signals to external devices to activate the devices.

As an example of this embodiment, a device that is built to detect motion can, after not detecting motion over a prolonged period of time, trigger a device to send a signal notification to a main hub or base station that transmits a warning notification message to a 24/7 emergency call center to have an operator check in with the user of the messaging device.

In another embodiment, a primary device is capable of receiving a wireless beacon or signal from a charging cradle as a method to establish that the device is located within a known premise or proximity. The charging cradle sending a wireless beacon allows the device to economize battery power by disregarding or minimizing location tracking services such as but not limited to GPS or Wi-Fi location services.

In another embodiment, a primary device is capable of receiving external power or charging while in motion. When the primary device sees long periods of activity in this charging mode, the device disregards a preset check-in or reset the check-in to a future check-in time to increase the accuracy and expedience of the GPS or other location-based technology process.

In yet another embodiment, a primary device is pre-programmed to wake up and check for its GPS location. However, the primary device is designed to set an internal timer that tracks activity. This occurs when a user is outside the home and in vehicle with constant acceleration or other patterns of motion that can be tracked to establish motion as a method of disregarding a preset check-in or resetting the check-in to a future check-in to economize battery power.

In another embodiment, when a primary device is in motion at an accelerated speed indicating the user is in a motorized vehicle, including, but not limited to a wheelchair, bicycle, motorcycle, scooter, bus, automobile, etc, and where the device detects a sudden deceleration or impact causing the device to automatically establish its location as well as initiating a call for help.

In another embodiment, when a primary device is in motion at an accelerated speed indicating the user is in a motorized vehicle, including, but not limited to a wheelchair, bicycle, motorcycle, scooter, bus, automobile, etc, and where the device detects a sudden deceleration or impact followed by random axis changes representing tumbling, flipping or rotating, ending with a complete stop causes the device to automatically establish its location as well as initiate a call for help.

In another embodiment, when a primary device is in motion at an accelerated speed indicating the user is in a motorized vehicle, including, but not limited to a wheelchair, bicycle, motorcycle, scooter, bus, automobile, etc, and where the device detects a sudden deceleration or impact followed by random axis changes representing tumbling, flipping or rotating, and after recognizing no further motion a preset time frame such as but not limited to one half second, one second, etc the device produces an audible, mechanical, physical or visual location beacon and or ask the user via but not limited to voice prompt, display or other methods if it should establish its location as well as initiate a call for help.

In an embodiment, voice control system is activated (e.g., at a listening state) at an occurrence of a predetermined condition. In an example, a voice control (e.g., receiving a voice command) of a PERS system (e.g., an assistance request pendant) is not activated until the occurrence of a predetermined condition to save battery power or a better energy management method. The predetermined condition includes a sensed sudden stop/deceleration, a car crash, a car accident, a car impact among other conditions. When the condition is sensed, the voice control receiving function is activated from an inactivate mode or less activated mode (e.g., sleep mode). The voice control system can be activated or inactivated until a predetermined condition. For example, the voice control system is activated from an inactivated state when a moving speed is higher than a human walking speed. Any unusual change of a speed or indication of an occurrence of an irregular event is able to be the condition to trigger the activation of the voice control system.

A further embodiment of an external device being triggered by a device utilizing one or more sensing units through activity or non-activity can include lights, power outlets, sirens, speakers, security systems, personal emergency response systems, wireless alarms, wireless transmitters, smoke alarms, CO Alarms, communication systems, smart speakers, and IoT devices.

In utilization, the device and method disclosed herein are used to reduce power consumption by sensing a pre-determined event or condition including motion or no motion (e.g., lack of a motion). When the pre-determined condition is detected or satisfied, the GPS function is reduced or stop for a predetermined condition (e.g., for a pre-determined duration (such as less wake up frequency, or shorter wake up duration), use an alternative communication method (e.g., lower power communication, such as Wi-Fi), and turn off GPS function.)

What is claimed is:

1. An energy saving method of a fall sensing device comprising:
   a) using a motion sensor monitoring an occurrence of a predetermined status over a predetermined period; and
   b) altering a pre-programmed GPS location checking action of the fall sensing device when sensing the occurrence of the predetermined status, wherein the predetermined status comprises a sensed inactivity over the predetermined period,
   wherein when the inactivity is detected over the predetermined period, the GPS location checking action is configured to be bypassed for one or more checking duty cycles by connecting to a Wi-Fi.

2. The method of claim 1, wherein the predetermined status comprises a sensed motion over the predetermined period.

3. The method of claim 1, wherein the inactivity comprises a condition when a user is sleeping.

4. The method of claim 1, wherein the altering the pre-programmed GPS location checking action comprises bypass, delay, stop, or modify a pre-programmed GPS location checking duty cycle.

5. The method of claim 1, further comprising bypassing the pre-programmed GPS location checking action when a Wi-Fi network is detected.

6. The method of claim 1, wherein the fall sensing device comprises a personal emergency response system (PERS).

7. The method of claim 1, wherein the motion sensor comprises an accelerometer, magnetometer, gyroscope, or a barometer.

8. The method of claim 1, further comprising using artificial intelligence (AI) to modify a pre-programmed wake-up routine of the pre-programmed GPS location checking action by learning periods of inactivity or activity of a user.

* * * * *